United States Patent
Shiga (10) Patent No.: US 8,879,179 B2
(45) Date of Patent: Nov. 4, 2014

(54) OSCILLATION MOTOR UNIT, OSCILLATION MOTOR, AND LENS DRIVING DEVICE USING OSCILLATION MOTOR

(75) Inventor: Naoto Shiga, Saitama (JP)

(73) Assignee: Tamron Co., Ltd., Saitama (JP)

( * ) Notice: Subject to any disclaimer, the term of this patent is extended or adjusted under 35 U.S.C. 154(b) by 5 days.

(21) Appl. No.: 13/254,365

(22) PCT Filed: Mar. 2, 2010

(86) PCT No.: PCT/JP2010/053321
§ 371 (c)(1),
(2), (4) Date: Sep. 1, 2011

(87) PCT Pub. No.: WO2010/101139
PCT Pub. Date: Sep. 10, 2010

(65) Prior Publication Data
US 2011/0317293 A1 Dec. 29, 2011

(30) Foreign Application Priority Data

Mar. 2, 2009 (JP) ................................ 2009-048669
Mar. 2, 2009 (JP) ................................ 2009-048670

(51) Int. Cl.
*G02B 7/02* (2006.01)
*H02N 2/10* (2006.01)
*H02N 2/12* (2006.01)
*G02B 7/10* (2006.01)

(52) U.S. Cl.
CPC ................ *G02B 7/102* (2013.01); *H02N 2/103* (2013.01); *H02N 2/126* (2013.01)
USPC .......................................... 359/824; 359/823

(58) Field of Classification Search
USPC ............ 359/694, 696, 822–824; 310/316.02, 310/317, 323.02, 323.16, 325, 328
See application file for complete search history.

(56) References Cited

U.S. PATENT DOCUMENTS

| | | | | |
|---|---|---|---|---|
| 6,392,328 | B1 * | 5/2002 | Ashizawa | 310/323.01 |
| 7,109,638 | B2 * | 9/2006 | Kitahara et al. | 310/323.16 |
| 2005/0185947 | A1 | 8/2005 | Honda et al. | |
| 2006/0113868 | A1 | 6/2006 | Sakatani et al. | |
| 2009/0302710 | A1 * | 12/2009 | Morishima et al. | 310/323.02 |

FOREIGN PATENT DOCUMENTS

| | | | |
|---|---|---|---|
| JP | 2000324864 A | * | 11/2000 |
| JP | 2002168308 A | | 6/2002 |
| JP | 2005229790 A | | 8/2005 |
| JP | 2006158054 A | | 6/2006 |
| JP | 4182588 B2 | | 11/2008 |

* cited by examiner

*Primary Examiner* — Mahidere Sahle
(74) *Attorney, Agent, or Firm* — The Webb Law Firm (57) ABSTRACT

The object of the present invention is to provide a driving mechanism which is a higher powered motor that can be used even when an installation space is limited by reducing a space required for installation of the motor as a motive power of a driving mechanism, and which prevents the influences of vibration and heat generation in the operation. To achieve the object, an oscillation motor unit, an oscillation motor and a lens driving device are employed in which the vibrator, a push mechanism pushing the vibrator in a specific direction to transmit the motive power of the vibrator in which a vibrator is made vibrate and convert the vibration energy to a motive power transmitted are included, wherein a first base member for setting the vibrator and the push mechanism is set at the position where the first base member is sandwiched between the vibrator and the push mechanism.

15 Claims, 8 Drawing Sheets

Fig. 9

OSCILLATION MOTOR UNIT, OSCILLATION MOTOR, AND LENS DRIVING DEVICE USING OSCILLATION MOTOR

FIELD OF THE INVENTION

The present invention relates to an oscillation motor unit, an oscillation motor, and a lens driving device using an oscillation motor, and more particularly, an oscillation motor which can be preferably installed in a small sized driving device.

BACKGROUND OF THE INVENTION

Motors are used as motive powers of various apparatuses that include a movable device, such as optical instruments and consumer use electronic products. According to high performance and size reduction in optical instruments, consumer use electronic products and the like, size reduction and higher power are required on driving mechanisms. To reply such requirements, a small sized DC geared motor has been used, and the small sized motor is coupled to multiple-stage reduction gears to achieve the same level of torque as that of a large sized motor. For example, Patent Document 1 relating to a motor rotation reducing mechanism that transmits a rotating force of a reversible motor to a driven object discloses a technology for reducing an installation space through installing plurality of rotatably supported gear gearing each other and alternately transmits rotation to increase a reduction ratio toward a rotating center shaft. However, because a driving device including such rotation reducing mechanism applies plurality of reduction gears, it requires wide installation space for reduction gears, i.e. a large space is required for the motor installation. In addition, drawbacks including poor stopping accuracy caused by backlash because of plurality of reduction gears and loud operation noise of the reduction gears are pointed out.

To solve these drawbacks, a driving device using an oscillation motor such as an ultrasonic motor has been proposed. The oscillation motor is constituted with a vibrator for generating specific vibration and a driven power transmission member in frictional-contact with the vibrator, and the motion energy of the vibrator transmitted to the driven power transmission member is converted to the motive power of the driving mechanism. Patent Document 3 discloses a driving device for an optical system which uses an oscillation motor as a motive power of a focusing operation in a lens barrel. The oscillation motor disclosed in Patent Document 3 includes an output shaft that is rotatably supported by a base member arranged along the outer peripheral surface of the output shaft, wherein a vibrator having a motive power output portion and a press member for making the motive power output portion of the vibrator contact with the outer peripheral surface of the output shaft are mounted on the base member, and the press member makes the vibrator contact with the output shaft to transmit a motive power of the oscillation motor to the output shaft. Such oscillation motor described above can enhance torque without using a plurality of reduction gear when compared to the DC geared motor disclosed in Patent Document 1 or the like.

[Patent Document 1] Japanese Patent Laid-Open No. 2002-168308

[Patent Document 2] Japanese Patent Laid-Open No. 2006-158054

[Patent Document 3] Japanese Patent No. 4182588

SUMMARY OF INVENTION

Technical Problem

For the products including a movable mechanism which has reduced size and high performance in recent years, further size reduction of driving mechanisms is required. In the technologies disclosed in Patent Documents 1 to 3, it is hard to reply to such requirements because a large space is required for the motor installation. In view of the drawbacks described above, a first object of the present invention is to provide a higher powered motor which can be installed in a limited installation space by reducing a space required for a motor as a motive power of a driving mechanism.

In addition, in the operation of an oscillation motor, the vibration of the oscillation motor is transmitted to the surroundings of a portion where the oscillation motor is installed to generate backlash or the like in components. Further, it has been pointed out that heat is generated in the operation of the oscillation motor and it affects on the operation of surrounding mechanisms. For example, in the ultrasonic motor disclosed in Patent Document 2, a vibrator unit is fixed to a housing, and in an oscillation motor disclosed in Patent Document 3, a vibrator is mounted on a plate-like base member. As a result, the vibration or heat generated in the ultrasonic motor is easy to directly transmit to the surrounding mechanisms, i.e. affection on the operation or durability of the surrounding mechanisms has been pointed out. For example, in the case in which the ultrasonic motor is applied to a lens focusing operation in a camera lens barrel as disclosed in Patent Document 3, the heat and vibration generated in the ultrasonic motor are transmitted to the barrel via the base member and it causes poor lens stopping accuracy.

Next, a second object of the present invention is to provide a driving mechanism which is free from influence of vibration and heat generated in the motive power device in addition to size reduction of the installation space in reply to the requirement on size reduction and high performance as a driving mechanism of a movable member.

Means To Solve the Problem

As a result of diligent study, the present inventor has achieved the above objects by employing an oscillation motor unit, an oscillation motor, and a lens driving device described below.

An oscillation motor unit according to the present invention is an oscillation motor unit which transmits a motive power utilizing a vibration energy generated during vibration of a vibrator, including: the vibrator; a push mechanism for pushing the vibrator in a specific direction; and a first base member for holding the vibrator and the push mechanism, wherein the vibrator and the push mechanism are held at the position where the first base member is sandwiched between the vibrator and the push mechanism.

The oscillation motor unit according to the present invention is preferable to further include a vibrator holder for holding the vibrator, wherein the vibrator holder is held in the first base member.

In the oscillation motor unit according to the present invention, the push mechanism is preferable to include an elastic member expanding and contracting in a direction substantially parallel to the direction in which the vibrator is pushed, and a push guide connected to the elastic member and in contact with the vibrator, and the push mechanism applies a push force of the elastic member via the push guide to transmit the motive power generated during the vibration of the vibrator.

In the oscillation motor unit according to the present invention, the push guide is preferable to include a push plane substantially perpendicular to the expansion and contraction direction of the elastic member, and the push plane is in contact with the vibrator at one side of the first base member, and the vibrator is pushed by the push force of the elastic member that is connected to the push guide at the other side of the first base member.

In the oscillation motor unit according to the present invention, the push guide is preferable to be set to gear into the first base member in a thickness direction and slidable in the direction in which the vibrator is pushed.

The oscillation motor unit according to the present invention is preferable to further include a second base member to which the first base member is mounted, and vibrator is fixed to be apart from the second base member in the state that the first base member is mounted on the second base member.

Oscillation motor according to the present invention: An oscillation motor according to the present invention is an oscillation motor which makes a driven power transmission member operate through pushing a vibrator toward the driven power transmission member by a push mechanism, making the vibrator contact with the driven power transmission member, making the vibrator vibrate, and transmitting the vibration energy of the vibrator to the driven power transmission member in contact with the vibrator, including: the vibrator; a first base member for holding the vibrator; and a second base member for mounting the first base member, and the vibrator is fixed to be apart from the second base member in the state that the first base member is mounted on the second base member.

The oscillation motor according to the present invention is preferable to further include a vibrator holder for holding the vibrator, and the first base member holds the vibrator holder.

In the oscillation motor according to the present invention, the first base member is preferable to be made of any one of aluminum, aluminum alloy, titanium, titanium alloy, germanium, germanium alloy, iron alloy family, and copper alloy.

In the oscillation motor according to the present invention, the second base member is preferable to include a mounting guide pole for mounting the first base member, and the second base member and the first base member are connected to each other via the mounting guide pole.

In the oscillation motor according to the present invention, the first base member is preferable to be provided with a cutaway space formed at a portion where the vibrator holder is set.

In the oscillation motor according to the present invention, the push mechanism is preferable to be set at a first surface common with the surface of the first base member where the vibrator holder is set, the push mechanism includes an elastic member, and the push mechanism is set at the first surface side of the first base member to push the vibrator toward the driven power transmission member by the elastic member.

Alternatively, in the oscillation motor according to the present invention, the push mechanism is preferable to be set at a second surface of the first base member different from the first surface where the vibrator holder is set.

In the oscillation motor according to the present invention, the push mechanism including the elastic member that expands and contracts in a direction substantially parallel to the direction in which the vibrator is pushed toward the driven power transmission member is preferable to be set at the second surface, the push mechanism is preferable to include a push guide that gears with the first base member in a thickness direction and slidable in the direction in which the vibrator is pushed toward the driven power transmission member, and the push mechanism transmits a push force of the elastic member to the vibrator toward the driven power transmission member via the push guide to make the vibrator contact with the driven power transmission member.

Lens driving device according to the present invention: A lens driving device according to the present invention is a lens driving device which makes a lens move linear in an optical-axis direction, wherein the lens is made move by using the oscillation motor described above.

Advantages of the Invention

In the construction of the oscillation motor unit according to the present invention, the vibrator and the push mechanism indispensable in the oscillation motor are set at the position where the first base member is sandwiched between the vibrator and the push mechanism and held by the first base member. Thus, an installation space required can be reduced as compared to the conventional case. As a result, the oscillation motor unit is preferable as a motive power for a small sized and high performance movable device.

The oscillation motor according to the present invention is free from transmission of the specific vibration of the oscillation motor to the surrounding portion where the oscillation motor is installed in addition to reduced size. As a result, the stopping accuracy of the oscillation motor is enhanced, and troubles caused by backlash due to the vibration can be prevented. The operation noise of the motor is also reduced. In addition, transmission of heat generated during operation of the oscillation motor to the driving mechanism is prevented. As a result, affection of the heat on electronic parts indispensable in recent optical instruments and consumer use electronic products can be prevented.

The lens driving device according to the present invention enables a space-saving because the lens is driven by the oscillation motor described above. In addition, the noise and the vibration in a lens barrel at the time of focusing and zooming is reduced.

DESCRIPTION OF EMBODIMENTS

Figure 1:
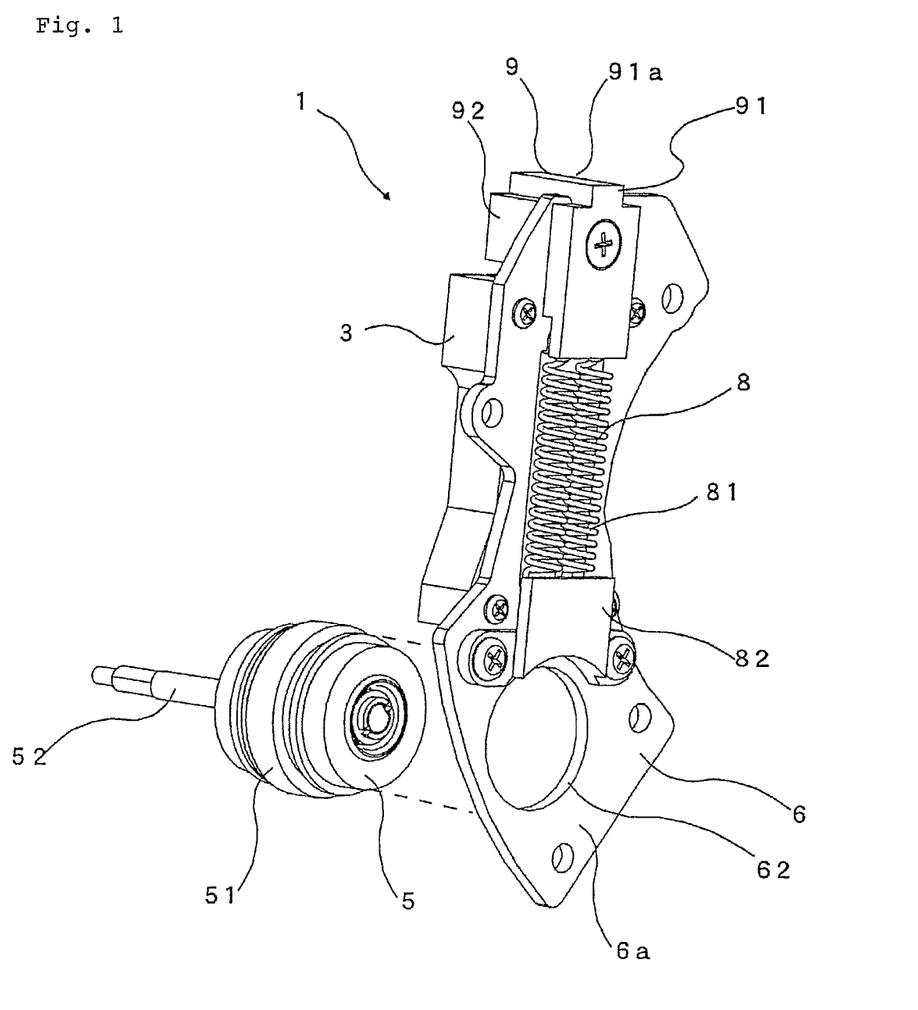
FIG. 1 is a plane view illustrating one example of an oscillation motor unit according to the present invention.
Figure 2:
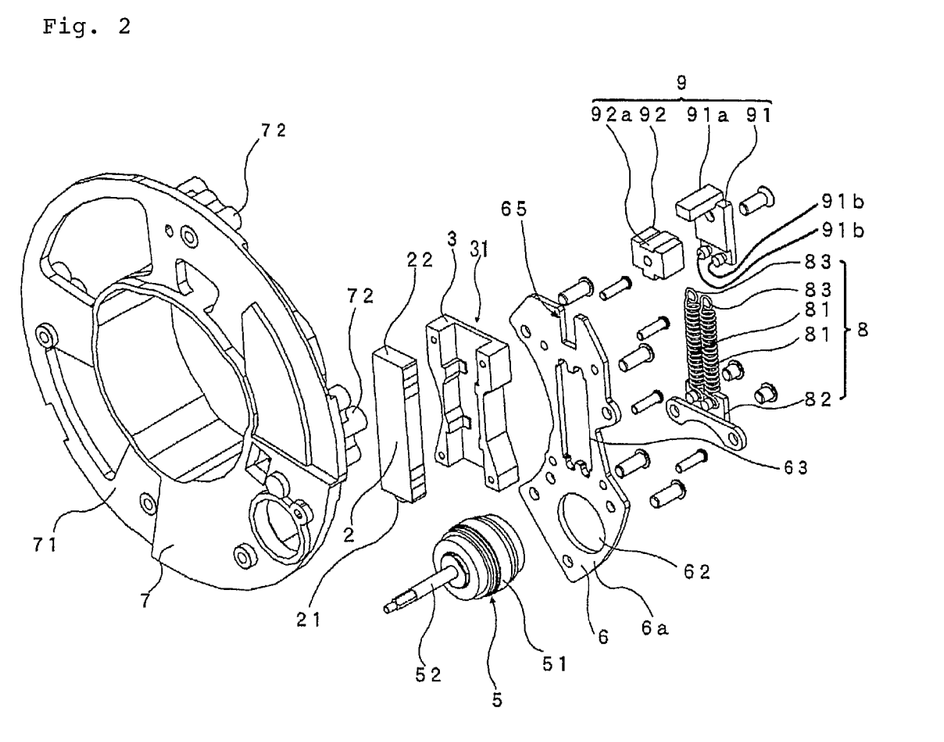
FIG. 2 is an exploded perspective view illustrating one example of the oscillation motor unit and an oscillation motor according to the present invention.

Oscillation motor unit: FIG. 1 is a plane view illustrating the one embodiment of an oscillation motor unit according to the present invention. The oscillation motor unit according to the present invention is an oscillation motor unit which transmits a motive power utilizing a vibration energy generated during vibration of a vibrator, a push mechanism, and a first base member. As shown in FIGS. 1 and 2, an oscillation motor unit 1 according to the present invention is characterized in that a vibrator 2 and the push mechanism 8 are held at positions where the first base member 6 is sandwiched between the vibrator 2 and the push mechanism 8. That is, the vibrator 2 and the push mechanism 8 are respectively set at different surfaces of the first base member 6. In the following, the embodiment of the oscillation motor unit according to the present invention will be demonstrated with referring to FIGS. 1 to 7.

An oscillation motor generates motive power utilizing the vibration energy of the vibrator. The motive power is transmitted to a driven power transmission member set depending on the intended use. To be more specific, the oscillation motor unit 1 according to the present invention is used to drive the driven power transmission member 5 in a preferable motion by making the vibrator 2 contact with a driven power transmission member 5, making the vibrator 2 vibrate and transmitting the vibration energy of the vibrator 2 to the driven power transmission member 5.

In the present embodiment, the vibrator 2 is composed of a piezoelectric element and has a shape of flat and substantially rectangular parallelepiped. As shown in FIG. 2, a projection 21 is formed on one side of the vibrator 2 from where a motive power output, and the projection 21 is made contact with the driven power transmission member 5. To generate a preferable vibration, the oscillation motor unit using the piezoelectric element is adjusted in the shape of the vibrator, a position in the vibrator where a voltage is loaded, a frequency or a voltage loaded or the like. In addition, the voltage loaded to the vibrator 2 is controlled to generate preferable vibration at the projection 21 to cause a preferable motion.

Next, a vibrator holder 3 has a frame body in which a groove-shaped container 31 for holding the vibrator 2 is formed as shown in FIG. 2. The vibrator holder 3 holds the vibrator 2 in a state in which the vibrator 2 can expand and contract and can also vibrate in a preferable direction. The container 31 of the vibrator holder 3 has a groove shape formed depending on the shape of the vibrator 2 and the projection 21 and an opposite side surface 22 of the vibrator 2 are exposed on the outer surface of the vibrator holder 3. Also, a voltage loading mechanism to make the vibrator 2 vibrate is set to the vibrator holder 3 so as to be connected to the vibrator 2. A vibration detection mechanism for detecting a vibration state of the vibrator, an electrode, or the like (not shown) are also set to the vibrator holder 3.

In the construction of the present embodiment, the vibrator holder 3 for holding the vibrator 2 is set in addition to the first base member 6, and the vibrator holder 3 is held in the first base member 6. However, the present invention is not limited to the construction described above. For example, the first base member may be integrally provided with a holder function for holding the vibrator, to enable direct holding of the vibrator in the first base member. With the integrated first base member, a separate holder component is not required, i.e. the number of components can be reduced for cost reduction.

The driven power transmission member 5 will be demonstrated. The driven power transmission member 5 performs a specific motion upon receiving the motive power generated by the oscillation motor unit 1 according to the present invention. For example, as shown in FIG. 1, a driving ring 51 is provided on a rotative shaft 52 in the driven power transmission member 5, and the controlled vibration generated in the vibrator 2 is transmitted to the driving ring 51, to generate a relative motion in the rotating direction of the rotative shaft 52 by a friction between the vibrator 2 and the driving ring 51. In the oscillation motor unit 1 of the present embodiment, the projection 21 of the vibrator 2 pushed to the driving ring 51 generates an elliptically rotating vibration at a contact surface with the driving ring 51. The rotating direction or rotation of the driving ring 51 can be controlled according to the magnitude of vibration or the direction of elliptically rotating vibration of the projection 21.

Next, the push mechanism 8 will be demonstrated. In the oscillation motor unit 1 according to the present invention, the projection 21 of the vibrator 2 is made contact with the driven power transmission member 5 to transmit the vibration energy of the vibrator 2 to the driven power transmission member 5 to be a motive power. The push mechanism 8 pushes the vibrator 2 in a specific direction, to thereby transmit the motive power generated by the vibrator 2 to the driven power transmission member 5.

For the push mechanism 8 pushing the vibrator 2 toward the driven power transmission member 5, utilizing of an elastic push force of an elastic member or using of a push mechanism such as a pneumatic system to push the vibrator can be exemplified. In the oscillation motor unit according to the present invention, when the elastic member is used for the push mechanism 8, the push mechanism 8 can be made light weight and simple.

The construction of the push mechanism is preferable to include the elastic member that expands and contracts in a direction substantially parallel to the direction in which the vibrator is pushed, and a push guide to transmit a push force of the elastic member to the vibrator in a specific direction and makes the vibrator contact with the driven power transmission member. A spring or the like may be used as the elastic member. The push guide is connected to the elastic member and is also in contact with the vibrator. The vibrator is made contact with the driven power transmission member by the push force of the elastic member via the push guide to transmit the vibration energy to the driven power transmission member.

In practice, the push guide includes a push plane substantially perpendicular to the expansion and contraction direction of the elastic member constituting the push mechanism and the push plane is made contact with the vibrator. A push force provided from the elastic member connected to the push guide set at the other surface side of the first base member is utilized to be the force for pushing the vibrator at one surface side of the first base member. In other words, to push the vibrator in substantially same direction the expansion and contraction direction of the elastic member, the push guide is set in the direction perpendicular to the expansion and contraction direction of the elastic member.

As long as the push plane of the push guide is substantially perpendicular to the expansion and contraction direction of the elastic member constituting the push mechanism, any construction may be employed for the push plane. For example, the push guide may be a substantially L-shaped member having a right-angled bent portion. That is, one surface of the substantially L-shaped side is set at the other surface side of the first base member where the push mechanism is held, as a parallel surface that is parallel to the expansion and contraction direction of the elastic member. The other surface of the substantially L-shaped side is set across both sides of the first base member in the thickness direction of the first base member, as a perpendicular surface that is perpendicular to the expansion and contraction direction of the elastic member. As a result, the parallel surface of the substantially L-shaped surface is connected to be parallel to the expansion and contraction direction of the elastic member, and the other perpendicular surface is set to extend to a position in contact with the vibrator in the thickness direction of the first base member, and thereby serves as the push plane to push the vibrator in the same direction as the expansion and contraction direction of the elastic member. Here, it is recommended that an opening or a cutaway where the push guide is set may be formed in the first base member, to restrict the moving direction of the push guide in a specific direction.

Next, a more preferable construction of a push guide 9 will be demonstrated with referring to FIGS. 1 to 5. The push guide 9 in the present embodiment is set to gear into the first base member 6 in the thickness direction and slidable in the direction in which the vibrator 2 is pushed.

As shown in FIG. 2, in the present embodiment, the push guide 9 is made gear into the first base member 6 by using the first push guide member 91 and the second push guide member 92. The first push guide member 91 is directly connected to an elastic member 81 and 81 of the push mechanism 8. In the example shown in FIG. 2, two springs 81 and 81 are used as the elastic member. Push mechanism connection portions 91*b* and 91*b* are set at the first push guide member 91, and end portions 83 and 83 of the elastic members 81 are connected to the push mechanism connection portions 91*b* and 91*b*. The push mechanism 8 and the push guide are connected to each other by setting the first push guide member 91 at the first base member 6 in the state where the push mechanism connection portions 91*b* and 91*b* are in contact with the first base member 6. The first push guide member 91 also includes a push plane 91*a* that extends in a direction perpendicular to the pushing direction (a direction indicated by an arrow B in FIG. 3) of the push mechanism 8.

In contrast, the second push guide member 92 is arranged between the first push guide member 91 and the vibrator 2 in coupling both components. A groove portion 92*a* where the push plane 91*a* of the first push guide member 91 is set is formed at the surface where the second push guide member 92 contacts with the first push guide member 91. The second push guide member 92 is set between the first push guide member 91 and the vibrator 2 in a state in which the push plane 91*a* of the first push guide member 91 is set in the groove portion 92*a*.

Figure 3:
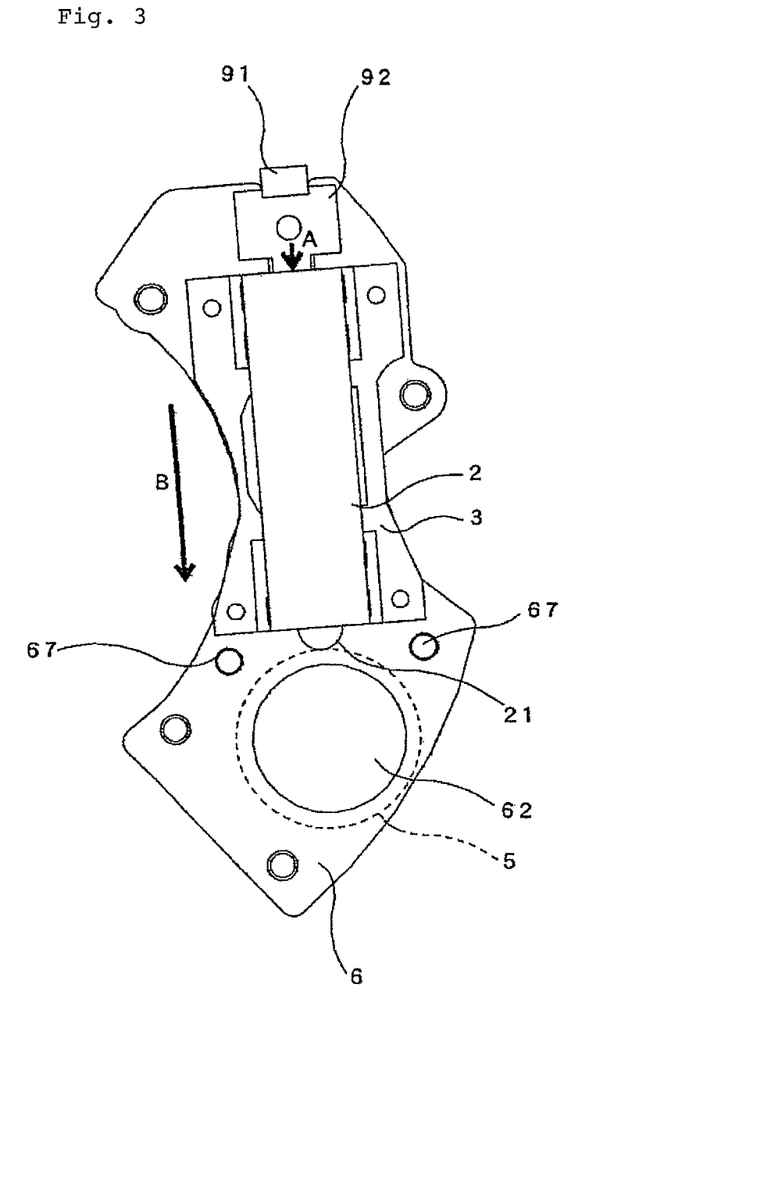
FIG. 3 is a plane view illustrating a vibrator side of the oscillation motor unit and the oscillation motor according to the present invention.
Figure 4:
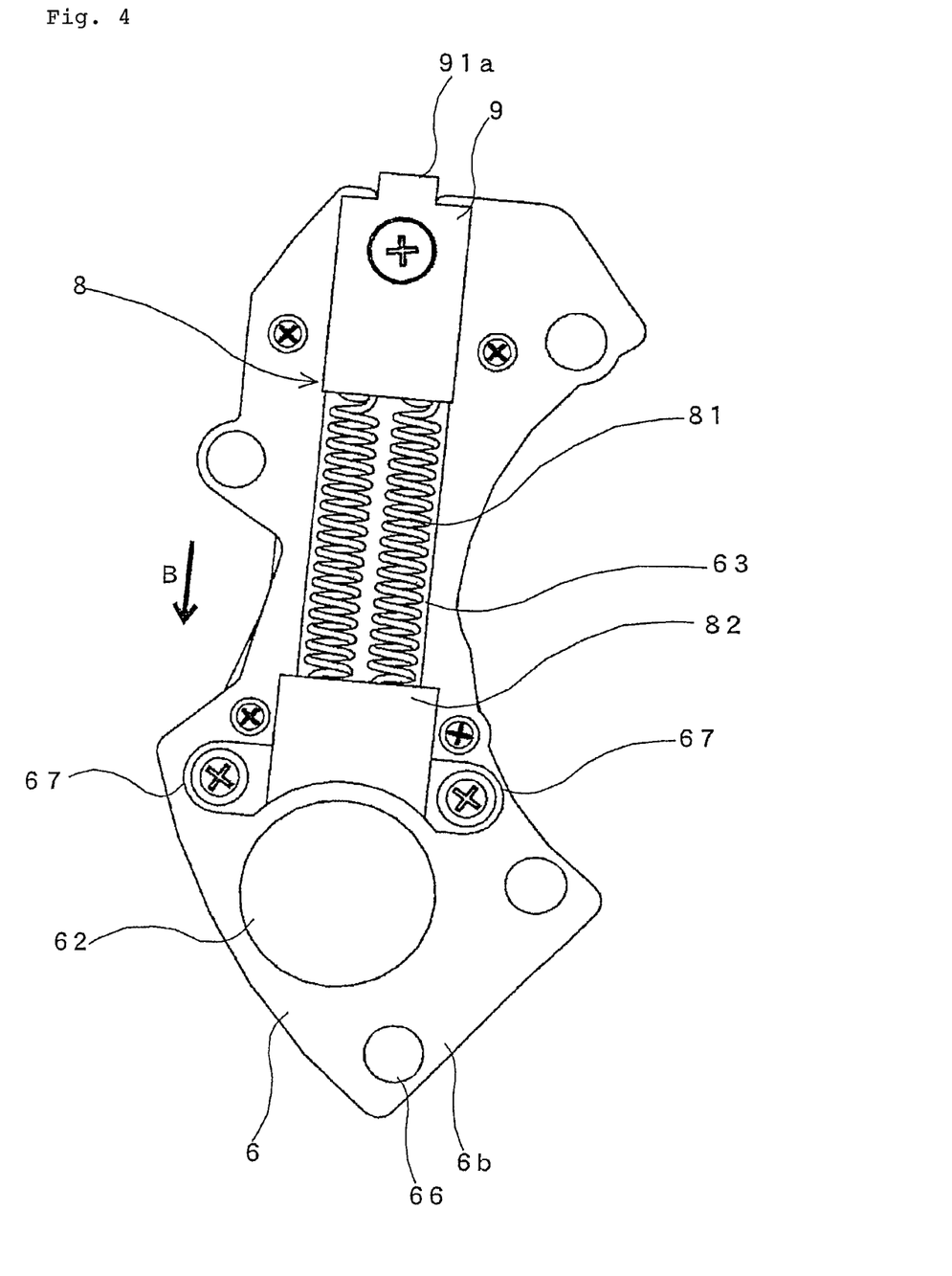
FIG. 4 is a plane view illustrating a push mechanism side of the oscillation motor unit and the oscillation motor according to the present invention.

Next, as shown in FIG. 4, the push mechanism 8 in the present embodiment is set to make the elastic direction of the elastic member 81 to be substantially parallel to the pushing direction of the vibrator 2 (the arrow B direction in FIGS. 3 and 4) at the other surface 6*b* of the first base member 6. A pulling force in the arrow B direction in FIG. 4 is applied to the first push guide member 91 connected to the push mechanism 8. Therefore, the second push guide member 92 is pushed toward the vibrator 2 by the push force from the push plane 91*a* of the first push guide member 91 in the arrow B direction at one surface 6*a* of the first base member 6 where the vibrator holder 3 is held as shown in FIG. 3. In other words, in the present embodiment, the second push guide member 92 transmits a push force from the push plane 91*a*. Because the push guide 9 gears with the first base member 6, the push force from the push plane 91*a* can be stably transmitted. As a result, the push force from the push mechanism 8 acts as the push force in the direction to make the vibrator 2 contact with the driven power transmission member 5 as a preferable direction via the push guide 9.

Figure 5:
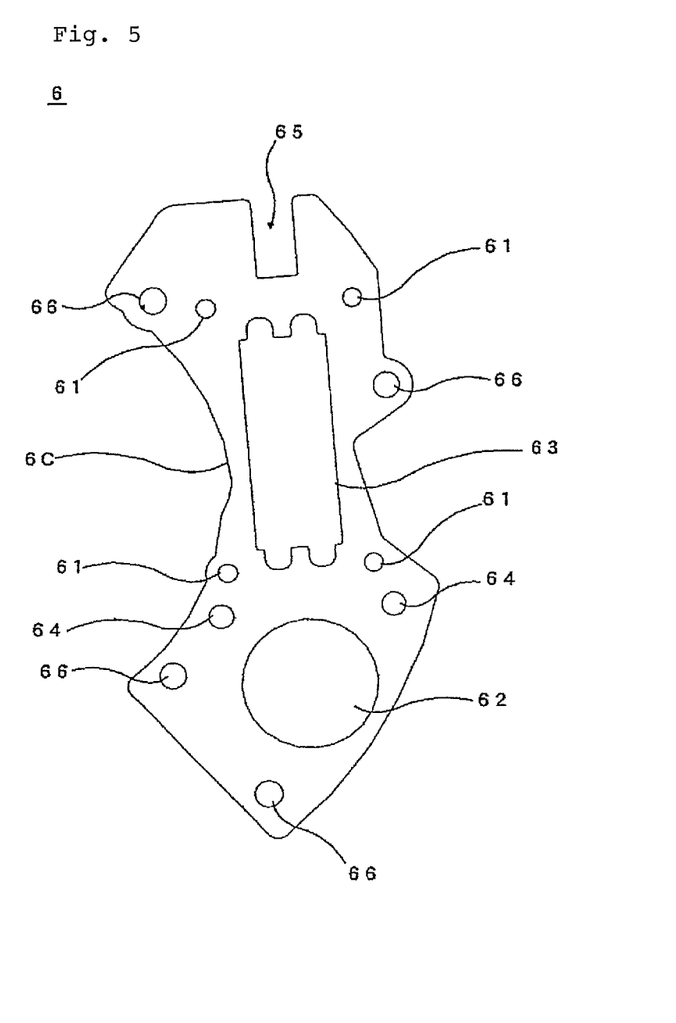
FIG. 5 is a plane view illustrating an example of a first base member of the oscillation motor unit and the oscillation motor according to the present invention.

Next, the first base member 6 will be demonstrated. FIG. 5 is a plane view illustrating a first base member 6 in the present embodiment. The first base member 6 is a substantially plate-like member for holding the vibrator holder 3 and the push mechanism 8. The first base member 6 also includes mounting portions or the like for setting the members. As shown in FIG. 5, the first base member 6 includes vibrator holder holding attachments 61 for fixing the vibrator holder 3 by screw bolt. The first base member 6 also includes a driven power transmission member arrangement hole 62 for holding the driven power transmission member 5 at a specific position where the driven power transmission member 5 set is held rotatably around the rotative shaft 52.

The push mechanism 8 is set at the other surface 6*b* of the first base member 6. The first base member 6 includes push mechanism setting holes 64 for fixing the push mechanism 8 by screw bolt. A base portion 82 of the push mechanism 8 is fixed to the push mechanism mounting holes 64.

Further, a push guide setting attachment 65 is formed to set the push guide 9 that transmits the push force from the elastic member 81 of the push mechanism 8 to the vibrator 2. As described above, in the present embodiment, the push guide 9 including the first push guide member 91 and the second push guide member 92 gears into the first base member 6. So, the cutaway space is formed to enable the push guide 9 gear into the first base member 6 in the thickness direction and slidable in the pushing direction of the vibrator 2. In other words, the first push guide member 91 and the second push guide member 92 are coupled via the push guide setting attachment 65 by screw bolt. In the state described above, the push guide 9 is set slidable in the pushing direction toward the driven power transmission member 5, i.e. the direction to push the vibrator 2. The other surface 6*b* of the first base member 6, and the push mechanism connection attachments 91*b* and 91*b* of the first push guide member 91 are in contact with each other.

The first base member 6 is preferably made of any one of aluminum, aluminum alloy, titanium, titanium alloy, germanium, germanium alloy, iron alloy family, and copper alloy. In the oscillation motor unit in the present embodiment, the vibrator holder 3 is not directly mounted on a second base member, but set at the first base member to prevent drawbacks caused by the vibration and heat generation of the vibrator 2 during operation. Moreover, when the first base member is constituted with the above material, the oscillation motor unit having excellent heat spreading and vibration resistance can be obtained. More specifically, by selecting any one of aluminum, aluminum alloy, titanium, titanium alloy, germanium, germanium alloy, iron alloy family, and copper alloy as the material of the first base member, the heat spreading and vibration resistance of the first base member are excellent, and the first base member can be reduced in weight and material cost. In particular, aluminum and aluminum alloy are suitable for working of the first base member by die casing, so precise shape in the first base member can be achieved.

Furthermore, a cutaway space 63 may be formed in the first base member 6 at a portion where the vibrator holder 3 is set. The cutaway space 63 is formed to prevent the first base member 6 from transmission of the heat generated in the vibrator 2 and reduce the vibration. More specifically, the vibrator 2 generates the vibration and heat during operation, and the vibration causes backlash in components and makes precise operation difficult. The heat generated during operation sometimes causes troubles in electronic parts indispensable in a control circuit of the vibrator, optical instruments and consumer use electronic products. So, accumulation of the heat during operation of the oscillation motor should be prevented. So, the cutaway space 63 is formed at a position adjacent to the vibrator 2 in the first base member 6 to prevent heat accumulation and vibration transmission. In the present embodiment, the elastic member 81 of the push mechanism 8 is set at the other surface 6b of the first base member 6 at the position where the cutaway space 63 is formed. It saves a space required for arranging the elastic member 81 and the oscillation motor can be reduced in size.

Figure 6:
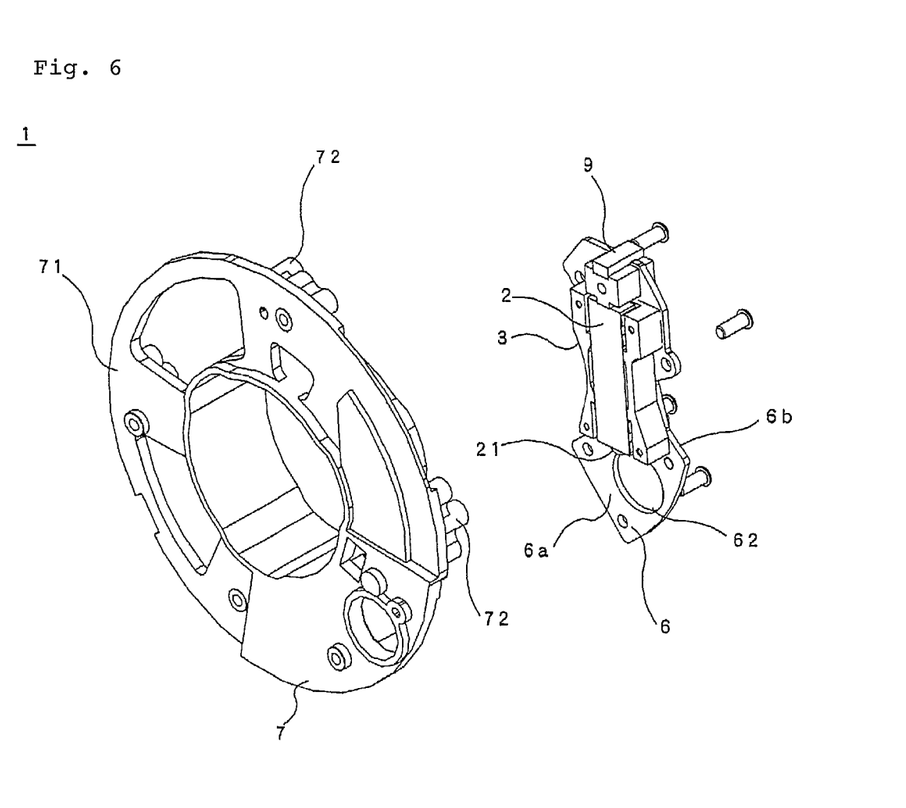
FIG. 6 is an exploded perspective view of one embodiment of the oscillation motor unit and the oscillation motor according to the present invention.
Figure 7:
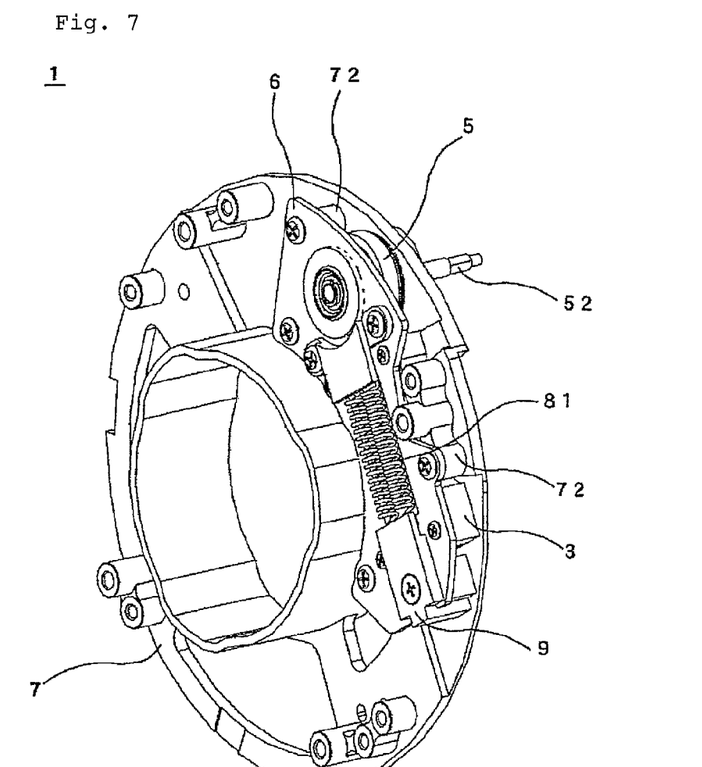
FIG. 7 is a perspective view of one embodiment of the oscillation motor unit and the oscillation motor according to the present invention.

The oscillation motor unit according to the present invention may also include a second base member 7 for mounting of the first base member 6, and the first base member 6 may be mounted on the second base member 7 as shown in FIGS. 2, 6 and 7. In this case, the first base member 6 is preferable to be mounted on the second base member 7 where the vibrator 2 is fixed to be apart from the second base member 7 when the first base member 6 is mounted on the second base member 7. The reason is to reduce transmission of the vibration and the heat generated in the vibrator 2 to the second base member 7 by avoiding direct contact between the second base member 7 and the vibrator 2.

In the present embodiment of the first base member 6, a shape in which an edge portion is partly bent in a substantially-arc shape is exemplified as shown in FIGS. 3 and the like. However, the present invention is not limited thereto. Any shape may be employed as long as the vibrator holder and the push mechanism can be set at opposite surfaces of a substantially plate-like base member, and held at positions where the first base member is sandwiched therebetween. Also, although the driven power transmission member arrangement hole 62 having a circular shape is exemplified, the present invention is not limited thereto. Any shape may be employed as long as the driven power transmission member 5 is held movable in a specific operation. Also, as long as the push guide setting attachment 65 formed in the first base member 6 makes the push guide 9 gear into the first base member 6 in the thickness direction and slidable in the direction to push the vibrator 2 toward the driven power transmission member 5, the shape of push guide setting attachment 65 is not limited to the cutaway shape. For example, the push guide setting attachment 65 may be an opening that extends in the sliding direction of the push guide 7.

The oscillation motor unit according to the present invention described above can make the installation space reduce. In addition, the oscillation motor unit can be installed as a higher powered and small sized motor unit in various movable apparatuses. For example, the oscillation motor unit according to the present invention can be installed in a lens driving device which makes a lens move linearly in an optical-axis direction. Because the oscillation motor unit according to the present invention requires reduced installation space, a space-saving construction can be achieved. Thus, more free arrangement in relation to other mechanisms set around the movable mechanism can be achieved.

Oscillation motor: In the following, embodiments of an oscillation motor according to the present invention will be demonstrated. The oscillation motor according to the present invention is an oscillation motor which makes a driven power transmission member operate by pushing a vibrator toward the driven power transmission member by a push mechanism to contact with the driven power transmission member, vibrating the vibrator, and transmitting the vibration energy of the vibrator to the driven power transmission member in contact with the vibrator, including: the vibrator; a first base member for holding the vibrator; and a second base member for mounting the first base member. The oscillation motor is characterized in that the vibrator is fixed to be apart from the second base member in the state that the first base member is mounted on the second base member.

Figure 8:
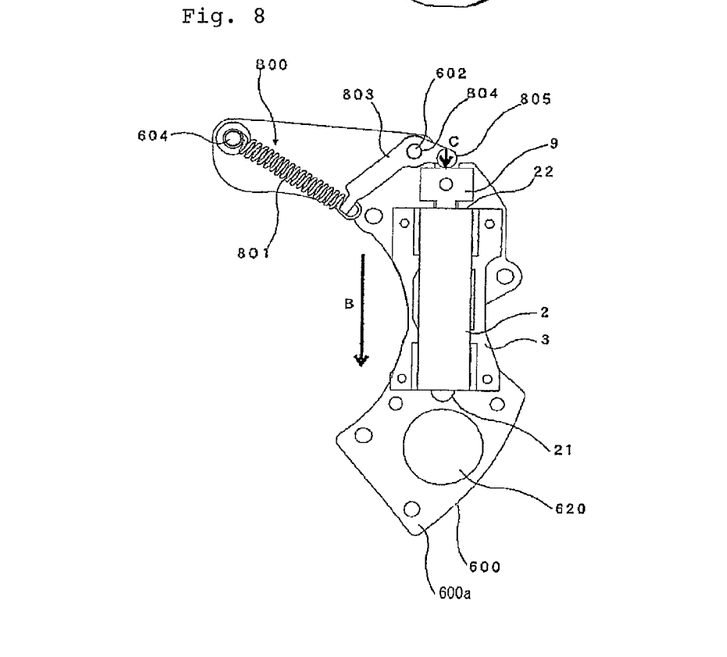
FIG. 8 is a plane view illustrating a state in which a vibrator holder is set in the first base member of the oscillation motor in the second embodiment.
Figure 9:
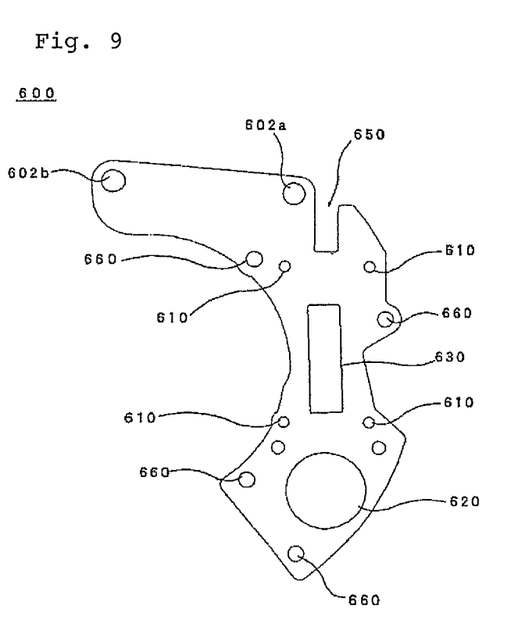
FIG. 9 is a plane view illustrating the first base member of the oscillation motor in the second embodiment of the present invention.

Next, a first embodiment and a second embodiment will be demonstrated. FIGS. 2 to 7 show a first embodiment of the oscillation motor according to the present invention. FIGS. 8 and 9 show a second embodiment of the oscillation motor according to the present invention.

First embodiment of the oscillation motor: An oscillation motor 1 in the first embodiment includes a vibrator 2 and a vibrator holder 3 for holding the vibrator vibratile in a specific direction as shown in FIGS. 2 and 6. In the first embodiment, a piezoelectric element constitutes the vibrator 2. The vibrator 2 has a substantially flat rectangular parallelepiped shape. The vibrator holder 3 has a frame body in which a groove-shaped container 31 for holding the vibrator 2 is formed. The vibrator holder 3 holds the vibrator 2 in a state in which the vibrator 2 can expand and contract and can also vibrate in a preferable direction. Also, a voltage loading mechanism to make the vibrator 2 vibrate is held to the vibrator holder 3 connectable to the vibrator 2. In addition, a vibration detection mechanism for detecting a vibration state of the vibrator, an electrode or the like not shown are set to the vibrator holder 3. In the oscillation motor using the piezoelectric element, a preferable vibration is controlled according to the shape of the vibrator, a position of the vibrator where a voltage is loaded, a frequency or a voltage or the like loaded.

In the first embodiment, the vibrator 2 expands and contracts when the voltage is loaded thereto. The vibrator 2 is pushed in a direction indicated by an arrow A in FIG. 3 by a push mechanism 8 via a push guide 9 described later. As a result, the vibrator 2 expands and contracts according to the loaded voltage while being pushed toward the arrow B direction in FIG. 3 by the push mechanism 8. A projection 21 of the vibrator 2 is made to contact with the driven power transmission member 5. To the vibrator 2, the controlled voltage is loaded to cause vibration at the projection 21 which generates a preferable motion.

The driven power transmission member 5 receives the motion in a specific direction according to the vibration generated in the vibrator 2. For example, as shown in FIG. 3, the driven power transmission member 5 includes a driving ring 51 on a rotative shaft 52. In this case, the controlled vibration of the vibrator is transmitted to the driving ring 51, and it generate a relative motion in the rotating direction of the rotative shaft 52 by a frictional force between the vibrator 2 and the driving ring 51. In the oscillation motor of the first embodiment, the projection 21 of the vibrator 2 contact with the driving ring 51 generates an elliptically rotating vibration at a contact surface with the driving ring 51. The rotating direction or rotation of the driving ring 51 can be adjusted according to the magnitude of elliptically rotating vibration of the projection 21.

Next, the push mechanism 8 will be demonstrated. In the oscillation motor, the vibrator 2 is made contact with the driven power transmission member 5 to transmit the vibration energy of the vibrator 2 to the driven power transmission member 5 to be a motive power. So, the push mechanism 8 is set to make the vibrator 2 contact with the driven power transmission member 5 by pushing the projection 21 of the vibrator 2 toward the driven power transmission member 5. The methods applicable to the push mechanism 8 pushing the vibrator 2 toward the driven power transmission member 5 can be exemplified as of using an elastic force of an elastic member or a push mechanism such as a pneumatic system to push the vibrator. When the elastic member is used for the push mechanism 8, the push mechanism 8 can be made light weight and simple. In addition, a spring can be employed as the elastic member.

As shown in FIG. 4, the push mechanism 8 in the first embodiment includes an elastic member 81 that expands and contracts in a direction (the arrow B direction in FIG. 3) substantially parallel to the direction in which the vibrator 2 is pushed. In the first embodiment, two springs are set in parallel as the elastic member 81. As shown in FIG. 4, a push force of the elastic member 81 is transmitted as a force to push the vibrator 2 toward the driven power transmission member, to make the vibrator 2 contact with the driven power transmission member. The push mechanism 8 in the first embodiment is set at a second surface 6b of a first base member 6.

The first base member 6 is a plate-like base member for holding the vibrator holder 3. The push mechanism 8 and the push guide 9 are also set at the first base member 6. FIG. 5 is a plane view of the first base member 6 in the first embodiment. As shown in FIG. 5, the first base member 6 includes vibrator holder holding attachments 61 for fixing the vibrator holder 3 with screw bolts, and a driven power transmission member arrangement hole 62 for holding the driven power transmission member 5. The vibrator holder 3 and the driven power transmission member 5 are set therein respectively.

Furthermore, a cutaway space 63 is formed in the first base member 6 at a portion where the vibrator holder 3 is set. The cutaway space 63 is formed to prevent transmission of the heat generated during the vibration of the vibrator 2 to the first base member 6 and to reduce the vibration. More specifically, the vibrator 2 generates the vibration and heat during operation, and the vibration causes backlash in components and affects on precise operation. Moreover, reduction of the generated vibration noise is required to make the commercial value excellent. The heat generated during operation sometimes causes troubles in electronic parts indispensable in a control circuit of the vibrator, optical instruments and consumer use electronic products. So, accumulation of the heat during operation of the oscillation motor should be prevented. So, the cutaway space 63 is formed at a position adjacent to the vibrator 2 in the first base member 6 to prevent heat accumulation and vibration transmission.

The push mechanism 8 is also set at the first base member 6. As shown in FIG. 5, the first base member 6 includes push mechanism setting holes 64 for fixing the push mechanism 8 with screw bolts. A base portion 82 of the push mechanism 8 is fixed to the push mechanism fixing holes 64.

A push guide setting attachment 65 for mounting the push guide 9 that transmits the push force from the elastic member constituting the push mechanism 8 to the vibrator 2 is further formed.

In the first embodiment, the spring as the elastic member 81 of the push mechanism 8 is set at the second surface 6b of the first base member 6 at the position where the cutaway space 63 is formed. It saves a space required for setting the elastic member 81 and the oscillation motor can be reduced in size.

Next, the push guide 9 will be demonstrated. As a method for transmitting the elastic force of the elastic member constituting the push mechanism to the vibrator, it is preferable to use the push guide for transmitting the elastic force to push the vibrator. The push guide is connected to the push mechanism to make contact with the vibrator. The push force of the elastic member is transmitted to the vibrator toward the driven power transmission member via the push guide to make the vibrator contact with the driven power transmission member.

As shown in FIGS. 2 to 4, the push guide 9 in the first embodiment includes a first push guide member 91 directly connected to the push mechanism 8 and a second push guide member 92 that is arranged between the first push guide member 91 and the vibrator 2 in contact with both components. The first push guide member 91 includes a push plane 91a that extends in a direction perpendicular to the pushing direction of the push mechanism 8 (the arrow B direction in FIG. 4). Push mechanism connection attachments 91b and 91b are set on the first push guide member 91, and end portions 83 and 83 of the elastic members 81 are connected to the push mechanism connection attachments 91b and 91b as shown in FIG. 2. Then, the first push guide member 91 is set at the first base member 6 in the state that the push mechanism connection attachments 91b and 91b are made contact with the second surface 6b of the first base member 6, and the push mechanism 8 and the push guide 9 are connected to each other.

Meanwhile, in the second push guide member 92, a groove portion 92a where the push plane 91a of the first push guide member 91 is set is formed at the surface contact with the first push guide member 91. The second push guide member 92 is arranged between the first push guide member 91 and the vibrator 2 in a state in which the push plane 91a of the first push guide member 91 is set in the groove portion 92a.

The push mechanism 8 in the first embodiment is set at the second surface 6b opposite to a first surface 6a of the first base member 6 where the vibrator holder 3 is held. The push mechanism 8 is set to make the projection 21 of the vibrator 2 contact with the driven power transmission member 5. The elastic direction of the elastic member 81 is arranged substantially parallel to the direction from the vibrator 2 toward the driven power transmission member 5 (the arrow B direction in FIG. 4). A pulling force in the arrow B direction in FIG. 4 is applied to the first push guide member 91 that is connected to the push mechanism 8. Therefore, the second push guide member 92 is pushed toward the vibrator 2 by the push plane 91a of the first push guide member 91 due to the push force in the arrow B direction at the first surface 6a of the first base member 6 where the vibrator holder 3 is held. As a result, the push force from the push mechanism 8 is utilized as the push force in the direction to make the vibrator 2 contact with the driven power transmission member 5 via the push guide 9.

In the construction of the first embodiment, the first base member 6 is geared by the first push guide member 91 and the second push guide member 92. More specifically, a cutaway space is formed as the push guide setting attachment 65 where the push guide 9 geared into the first base member 6 in the thickness direction and slidable in the direction to push the vibrator 2 toward the driven power transmission member 5. In other words, the first push guide member 91 and the second push guide member 92 are connected to each other with a screw bolts to sandwich the push guide setting attachment 65 therebetween. The push guide 9 is set slidable in the direction to push the vibrator 2 toward the driven power transmission member 5 in the above state. The other surface 6b of the first base member 6 is made contact with the push mechanism connection attachments 91b and 91b of the first push guide member 91.

The first base member 6 includes second base member connection attachments 66 to be mounted on a second base member 7 in a state in which the vibrator holder 3 holding the vibrator 2 and the driven power transmission member 5 are held therein. In the first embodiment, openings to insert screw bolts for mounting the first base member 6 onto mounting guide poles 72 of the second base member 7 described later are formed at specific positions.

In the oscillation motor according to the present invention, the first base member is preferable to be made of similar materials to those of the oscillation motor unit for similar reasons thereto.

Next, the second base member will be demonstrated. The second base member is provided with the mounting guide poles 72 and 72 for mounting the first base member 6 at a substantially plate-like base portion 71 as shown in FIGS. 2, 6 and 7. In the first embodiment, the substantially plate-like base portion 71 has a circular shape, and openings having an arc edge portions are formed in the center as shown in FIG. 2. As a lens is arranged in the arc edge portion of the second base member 7, the oscillation motor is set in a lens peripheral region. Although the state in which the arc opening is formed in the substantially center portion of the base portion of the second base member is exemplified in the first embodiment, the present invention is not limited thereto. Any shape may be appropriately designed according to the installation position of the oscillation motor.

As described above, the first base member 6 is mounted on the second base member 7 in a state in which the vibrator holder 3, the driven power transmission member and the like are set on the first base member 6. That is, after aligning the mounting guide poles 71 fixed on the second base member 7 with the second base member connection attachments 66 formed on the first base member 6, the first base member 6 is fixed to the second base member 7 with screw bolts. The height of the mounting guide pole 71 is designed according to the thickness of the vibrator 2 and the vibrator holder 3, and the first base member 6 is mounted on the second base member 7 in the state in which the vibrator 2 is fixed to be apart from the second base member 7. The reason is to prevent transmission of the vibration and heat generated in the vibrator 2 to the second base member 7 by avoiding direct contact between the second base member 7 and the vibrator 2.

A case in which the oscillation motor 1 in the first embodiment is set in a lens barrel for use in a lens driving device that makes a lens linearly move in an optical-axis direction will be demonstrated. As shown in FIG. 2, because the opening having the arc edge portion is formed in the substantially center portion of the second base member 7, the oscillation motor in the first embodiment can be set in the lens barrel to enable the lens arrangement in the opening. It means that the oscillation motor can be set adjacent to a lens peripheral region because the edge portion of the first base member 6 is arranged along the arc edge portion of the second base member 7. In the oscillation motor in the first embodiment, because the space in a planar direction along the base portion 72 of the second base member 7 can be reduced, a space-saving construction can be achieved and it makes arrangement in the lens barrel easy in relation to other mechanisms used. When the oscillation motor according to the present invention is installed in the lens driving device as in the first embodiment, a space-saving lens driving mechanism can be achieved, and the noise from the lens barrel can be reduced and the vibration can be reduced in the operation of focusing and zooming. Also, improved stopping accuracy enables reliable focusing in high speed.

Second embodiment of the oscillation motor: FIG. 8 is a plane view demonstrating the second embodiment of the oscillation motor according to the present invention illustrating a state in which the vibrator holder 3 and a push mechanism 800 are set at a first base member 600. The second embodiment differs from the first embodiment in the construction and arrangement of the push mechanism. More specifically, the push mechanism 800 is set at the same surface as a first surface 600a of the first base member 600 where the vibrator holder 3 is held as shown in FIG. 8. When the vibrator holder 3 and the push mechanism 800 are set at the same surface of the first base member 600, the thickness of the oscillation motor 1 can be reduced. In the second embodiment, the vibrator, the vibrator holder, and the driven power transmission member are common with those in the first embodiment. Thus, the descriptions on the vibrator 2, the vibrator holder 3, and the driven power transmission member 5 will be omitted.

FIG. 9 is a plane view illustrating the first base member 600 in the second embodiment. In the first base member 600 in the second embodiment, vibrator holder holding attachments 610, a driven power transmission member arrangement hole 620, a cutaway space 630, second base member connection attachments 660, and a push guide setting attachment 650 are common with those in the first embodiment, and the description thereof will be omitted.

The first base member 600 in the second embodiment includes push mechanism setting attachments 602a and 602b on the first surface at where the vibrator holder 3 is held. The push mechanism setting attachments 602a and 602b composed of a pole 602a to which a push arm 803 is rotatably mounted, and a connection attachment 602b to which an elastic member 801 is connected and are formed projecting at an end portion of the first base member 600.

Next, the push mechanism will be demonstrated. As shown in FIG. 8, the push mechanism 800 in the second embodiment includes the elastic member 801 formed of a spring, and the push arm 803. One end portion of the push arm 803 is connected to the elastic member 801, and the other end portion is made to contact with the push guide 9. The push arm 803 is held in the state that the vibrator 2 is enabled to be pushed toward the driven power transmission member 5 (a direction indicated by an arrow C in FIG. 8) by utilizing an elastic force of the elastic member 801. That is, one end portion of the elastic member 801 is connected to a push mechanism setting attachment 604 that is formed to project on the first base member 600. The other end portion of the elastic member 801 is connected to the push arm 803. The push arm 803 converts the elastic force of the elastic member 801 into a push force in a specific direction based on the principle of leverage, and is rotatably set at the push mechanism setting attachment 602 composed of the pole that projects from the first surface 600a of the first base member 600.

A push force-side end portion 805 of the push arm 803 is in contact with the push guide 9. A push force in the arrow C direction in FIG. 8 is applied from the push plane 805 of the push arm 803 to the push guide 9 by the push mechanism 800 described above. Then, the vibrator 2 is pushed toward the driven power transmission member 5 via the push guide 9, to make the projection 21 of the vibrator 2 contact with the driving ring 51 of the driven power transmission member 5. The vibration operation of the vibrator 2 is common with that in the first embodiment. Also in the second embodiment, an R-shaped edge portion having the same size as that of the arc-shaped edge portion formed in the first embodiment is formed in the center portion of the second base member. When the oscillation motor having the construction described above is installed in a lens driving device, the oscillation motor can be set adjacent to a lens peripheral region.

In the first and second embodiments of the oscillation motor, the oscillation motor composed of the vibrator holder for holding the vibrator, the first base members 6 and 600 made of metal excellent in heat spreading and vibration resistance for holding the vibrator holder, and the second base member 7 to which the first base members 6 and 600 are mounted are exemplified. However, the present invention is not limited thereto. More specifically, the vibrator holder 3 for holding the vibrator 2 is provided in addition to the first base members 6 and 600, and the vibrator holder 3 is held at the first base members 6 and 600, and the first base members 6 and 600 are mounted on the second base member 7 in the first and second embodiments. However, in one example the present invention, the first base member may be integrally provided with a holder function for holding the vibrator, and the first base member directly holding the vibrator may be set at the second base member instead of the construction described above. Such construction making it free from additional use of the holder component may achieve reduction in both the number of components and the cost.

INDUSTRIAL APPLICABILITY

The oscillation motor unit according to the present invention reduces size of the driving mechanism because installation space and thickness are reduced. Also, the oscillation motor unit and the oscillation motor according to the present invention do not only save the space but also reduce the influences of the vibration and heat generated during the operation of the oscillation motor. Thus, the oscillation motor unit and the oscillation motor can be used as a motive power of a movable mechanism in small sized and high performance consumer use electronic products and various small sized apparatuses in addition to the small sized optical-system lens driving mechanism. Accordingly, a movable device excellent in highly accurate control and durability can be provided. So the present invention can be applied to optical instruments and consumer use electronic products having a small sized movable mechanism.

REFERENCE SIGNS LIST

1: Oscillation motor unit
2: Vibrator
3: Vibrator holder
5: Driven power transmission member
6,600: First base member
6*a*: First surface of a first base member
6*b*: Second surface of a first base member
7: Second base member
8,800: Push mechanism
9: Push guide
63: Cutaway space
71: Mounting guide pole
81: Elastic member
91*a*: Push plane

The invention claimed is:

1. An oscillation motor unit which transmits a motive power utilizing a vibration energy generated during vibration of a vibrator, including:
   the vibrator;
   a push mechanism for pushing the vibrator in a specific direction; and
   a first base member for holding the vibrator and the push mechanism, wherein
   the vibrator and the push mechanism are held at the position where the first base member is sandwiched between the vibrator and the push mechanism; and
   the vibrator is set at one surface of the first base member and the push mechanism is set at another surface opposite to the surface where the vibrator is set of the first base member.

2. The oscillation motor unit according to claim 1, further including a vibrator holder for holding the vibrator, wherein the vibrator holder is held in the first base member.

3. The oscillation motor unit according to claim 1, wherein the push mechanism includes an elastic member expanding and contracting in a direction substantially parallel to the direction to which the vibrator is pushed, and
   a push guide connected to the elastic member and in contact with the vibrator, wherein
   the push mechanism applies a push force of the elastic member via the push guide to transmit motive power generated during the vibration of the vibrator.

4. The oscillation motor unit according to claim 3, wherein the push guide includes a push plane substantially perpendicular to the expansion and contraction direction of the elastic member, and
   the push plane is in contact with the vibrator at one side of the first base member, wherein
   the vibrator is pushed by the push force of the elastic member that is connected to the push guide at the other side of the first base member.

5. The oscillation motor unit according to claim 3, wherein the push guide is set to gear into the first base member in a thickness direction and slidable in the direction in which the vibrator is pushed.

6. The oscillation motor unit according to claim 1, further including a second base member for mounting the first base member, wherein
   the vibrator is fixed to be apart from the second base member in a state that the first base member is mounted on the second base member.

7. An oscillation motor which makes a driven power transmission member operate through pushing a vibrator toward the driven power transmission member by a push mechanism, making the vibrator contact with the driven power transmission member, making the vibrator vibrate, and transmitting the vibration energy of the vibrator to the driven power transmission member in contact with the vibrator, including:
   the vibrator;
   a first base member for holding the vibrator; and
   a second base member for mounting the first base member, wherein
   the push mechanism is set at one surface of the first base member and the vibrator is set at another surface opposite to the surface where the vibrator is set of the first base member; and
   the vibrator is fixed to be apart from the second base member in the state that the first base member is mounted on the second base member.

8. The oscillation motor according to claim 7, further including a vibrator holder for holding the vibrator, wherein the first base member holds the vibrator holder.

9. The oscillation motor according to claim 7, wherein the first base member is made of any one of aluminum, aluminum alloy, titanium, titanium alloy, germanium, germanium alloy, iron alloy family, and copper alloy.

10. The oscillation motor according to claim 7, wherein the second base member includes a mounting guide pole for mounting the first base member, and
    the second base member and the first base member are connected to each other via the mounting guide pole.

11. The oscillation motor according to claim 7, wherein the first base member is provided with a cutaway space formed at a portion where the vibrator holder is set.

12. The oscillation motor according to claim 7, wherein
the push mechanism is set at a first surface common with a surface of the first base member where the vibrator holder is set,
the push mechanism includes an elastic member, wherein
the push mechanism is set at the first surface side of the first base member to enable pushing of the vibrator toward the driven power transmission member by the elastic member.

13. The oscillation motor according to claim 7, wherein
the push mechanism is set at a second surface of the first base member different from the first surface where the vibrator holder is set.

14. The oscillation motor according to claim 13, wherein
the push mechanism including the elastic member that expands and contracts in a direction substantially parallel to the direction in which the vibrator is pushed toward the driven power transmission member is set at the second surface,
the push mechanism includes a push guide that gears into the first base member in a thickness direction and slidable in the direction in which the vibrator is pushed toward the driven power transmission member, and
the push mechanism transmits a push force of the elastic member to the vibrator toward the driven power transmission member via the push guide to make the vibrator contact with the driven power transmission member.

15. The oscillation motor according to claim 7, wherein a lens is moved linearly in an optical-axis direction at least in part by said oscillation motor.

* * * * *